United States Patent
Luo et al.

(10) Patent No.: US 10,351,129 B2
(45) Date of Patent: Jul. 16, 2019

(54) COLLISION MITIGATION AND AVOIDANCE

(71) Applicant: Ford Global Technologies, LLC, Dearborn, MI (US)

(72) Inventors: Wangdong Luo, Auburn Hills, MI (US); Nanjun Liu, Ann Arbor, MI (US); Kun Deng, Ann Arbor, MI (US); Alex Maurice Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/498,078

(22) Filed: Apr. 26, 2017

(65) Prior Publication Data

US 2018/0201258 A1 Jul. 19, 2018

Related U.S. Application Data

(60) Provisional application No. 62/446,153, filed on Jan. 13, 2017.

(51) Int. Cl.
| | |
|---|---|
| *G08G 1/16* | (2006.01) |
| *B60W 10/18* | (2012.01) |
| *B60W 10/20* | (2006.01) |
| *B60W 30/09* | (2012.01) |
| *B60W 50/14* | (2012.01) |

(52) U.S. Cl.
CPC .......... *B60W 30/09* (2013.01); *B60W 10/18* (2013.01); *B60W 10/20* (2013.01); *B60W 50/14* (2013.01); *G08G 1/166* (2013.01); *B60W 2050/143* (2013.01); *B60W 2050/146* (2013.01); *B60W 2420/42* (2013.01); *B60W 2420/52* (2013.01); *B60W 2420/54* (2013.01); *B60W 2710/18* (2013.01); *B60W 2710/20* (2013.01)

(58) Field of Classification Search
None
See application file for complete search history.

(56) References Cited

U.S. PATENT DOCUMENTS

| | | | |
|---|---|---|---|
| 5,341,142 A * | 8/1994 | Reis | F41G 7/2226 244/3.15 |
| 5,471,214 A * | 11/1995 | Faibish | G01S 13/931 342/54 |
| 5,710,565 A | 1/1998 | Shirai et al. | |

(Continued)

FOREIGN PATENT DOCUMENTS

| | | |
|---|---|---|
| EP | 3249630 A2 | 11/2017 |
| JP | 2012014257 A | 1/2012 |

OTHER PUBLICATIONS

Geng, Shifeng et al, "A New Method for Target Object Selection for ACC System Based on Analysis of Vehicle Trajectories," SAE International; Apr. 1, 2014; 2 pages.

(Continued)

*Primary Examiner* — Navid Ziaeianmehdizadeh
(74) *Attorney, Agent, or Firm* — Frank A. MacKenzie; Bejin Bieneman PLC

(57) ABSTRACT

A respective confidence level of a potential collision is determined for each of a plurality of targets based on each target's heading angle and distance from a host vehicle. A threat number is determined for each target when its respective confidence level is above a threshold. A vehicle component is actuated based on the threat number.

20 Claims, 11 Drawing Sheets

(56) References Cited

U.S. PATENT DOCUMENTS

| | | | |
|---|---|---|---|
| 6,085,151 A * | 7/2000 | Farmer | G01S 7/023 342/70 |
| 6,624,782 B2 | 9/2003 | Jocoy et al. | |
| 6,944,544 B1 * | 9/2005 | Prakah-Asante | B60R 21/0134 342/42 |
| 7,034,668 B2 * | 4/2006 | Engelman | B60R 21/013 180/275 |
| 7,124,027 B1 * | 10/2006 | Ernst, Jr. | B60W 30/09 701/301 |
| 7,755,473 B2 * | 7/2010 | Birk | B60Q 9/00 340/435 |
| 8,244,408 B2 * | 8/2012 | Lee | B60W 30/0953 180/169 |
| 8,463,500 B2 * | 6/2013 | Cuddihy | B60R 21/0132 280/735 |
| 8,552,848 B2 | 10/2013 | Rao et al. | |
| 8,762,043 B2 | 6/2014 | Eidehall et al. | |
| 9,187,091 B2 * | 11/2015 | Mills | B60W 40/107 |
| 9,250,324 B2 * | 2/2016 | Zeng | G01S 13/87 |
| 9,390,624 B2 | 7/2016 | Minernora et al. | |
| 9,701,307 B1 * | 7/2017 | Newman | B60W 30/09 |
| 9,718,468 B2 * | 8/2017 | Barfield, Jr. | B60W 30/095 |
| 2006/0085131 A1 * | 4/2006 | Yopp | B60W 30/085 701/301 |
| 2006/0282218 A1 * | 12/2006 | Urai | B60W 30/09 701/301 |
| 2007/0150196 A1 * | 6/2007 | Grimm | B60T 7/22 701/301 |
| 2009/0045928 A1 | 2/2009 | Rao et al. | |
| 2009/0192710 A1 * | 7/2009 | Eidehall | B62D 15/0265 701/301 |
| 2009/0292468 A1 * | 11/2009 | Wu | G01S 13/726 701/301 |
| 2009/0299593 A1 * | 12/2009 | Borchers | B60W 10/184 701/70 |
| 2010/0030426 A1 * | 2/2010 | Okita | B60T 7/22 701/41 |
| 2011/0077864 A1 * | 3/2011 | Konijnendijk | G01S 13/723 701/301 |
| 2012/0083947 A1 * | 4/2012 | Anderson | B60W 30/09 701/3 |
| 2012/0130629 A1 * | 5/2012 | Kim | B60W 30/085 701/301 |
| 2013/0030686 A1 * | 1/2013 | Morotomi | G08G 1/167 701/301 |
| 2013/0179047 A1 * | 7/2013 | Miller | B60W 30/09 701/70 |
| 2014/0244114 A1 * | 8/2014 | Matsubara | G05D 1/024 701/41 |
| 2014/0297171 A1 | 10/2014 | Minemura et al. | |
| 2014/0324297 A1 * | 10/2014 | Kim | B60W 10/20 701/48 |
| 2015/0046078 A1 * | 2/2015 | Biess | G08G 1/166 701/301 |
| 2015/0066348 A1 * | 3/2015 | Baba | G08G 1/166 701/301 |
| 2015/0298692 A1 * | 10/2015 | Minemura | B60W 30/08 701/70 |
| 2015/0336579 A1 * | 11/2015 | Yoshizawa | B60W 30/08 701/70 |
| 2016/0052515 A1 | 2/2016 | Choi et al. | |
| 2016/0071417 A1 * | 3/2016 | Lewis | G08G 1/162 701/301 |
| 2016/0103218 A1 * | 4/2016 | Mandava | G01S 13/931 701/301 |
| 2016/0109571 A1 | 4/2016 | Zeng et al. | |
| 2016/0121887 A1 * | 5/2016 | Jeon | B60W 30/0956 701/301 |
| 2016/0194000 A1 * | 7/2016 | Taki | B60T 7/22 701/70 |
| 2016/0195615 A1 * | 7/2016 | Tobeta | G01S 17/936 701/70 |
| 2016/0200321 A1 * | 7/2016 | Yamada | B60W 10/06 701/96 |
| 2016/0288799 A1 * | 10/2016 | Nguyen Van | B60W 50/029 |
| 2017/0101093 A1 * | 4/2017 | Barfield, Jr. | B60W 30/095 |
| 2017/0113665 A1 * | 4/2017 | Mudalige | G08G 1/166 |
| 2017/0113683 A1 * | 4/2017 | Mudalige | B60W 30/08 |
| 2017/0162050 A1 * | 6/2017 | Chen | B60W 30/09 |
| 2017/0217395 A1 * | 8/2017 | Baba | B60R 21/0134 |
| 2018/0015918 A1 * | 1/2018 | Bae | B60W 30/09 |

OTHER PUBLICATIONS

Search Report issued by United Kingdom Intellectual Property Office dated Jun. 25, 2018 regarding GB Application No. 1800316.0 (5 pages).

* cited by examiner

COLLISION MITIGATION AND AVOIDANCE

CROSS-REFERENCE TO RELATED APPLICATIONS

The subject patent application claims priority to and all the benefits of U.S. Provisional Patent Application No. 62/446,153 filed on Jan. 13, 2017, which is herein incorporated by reference in its entirety.

BACKGROUND

Vehicle collisions often occur at intersections. Collision mitigation between a host vehicle and a target may be difficult and expensive to implement. For example, determining a threat assessment for the target may require data from a plurality of sensors. Each of the plurality of sensors may require additional computation from a vehicle computer, increasing the difficulty of performing collision mitigation for multiple targets. Furthermore, performing the threat assessment for several targets can be computationally costly for the vehicle computer, especially when certain targets may have a lower risk of a collision.

DETAILED DESCRIPTION

Figure 1:
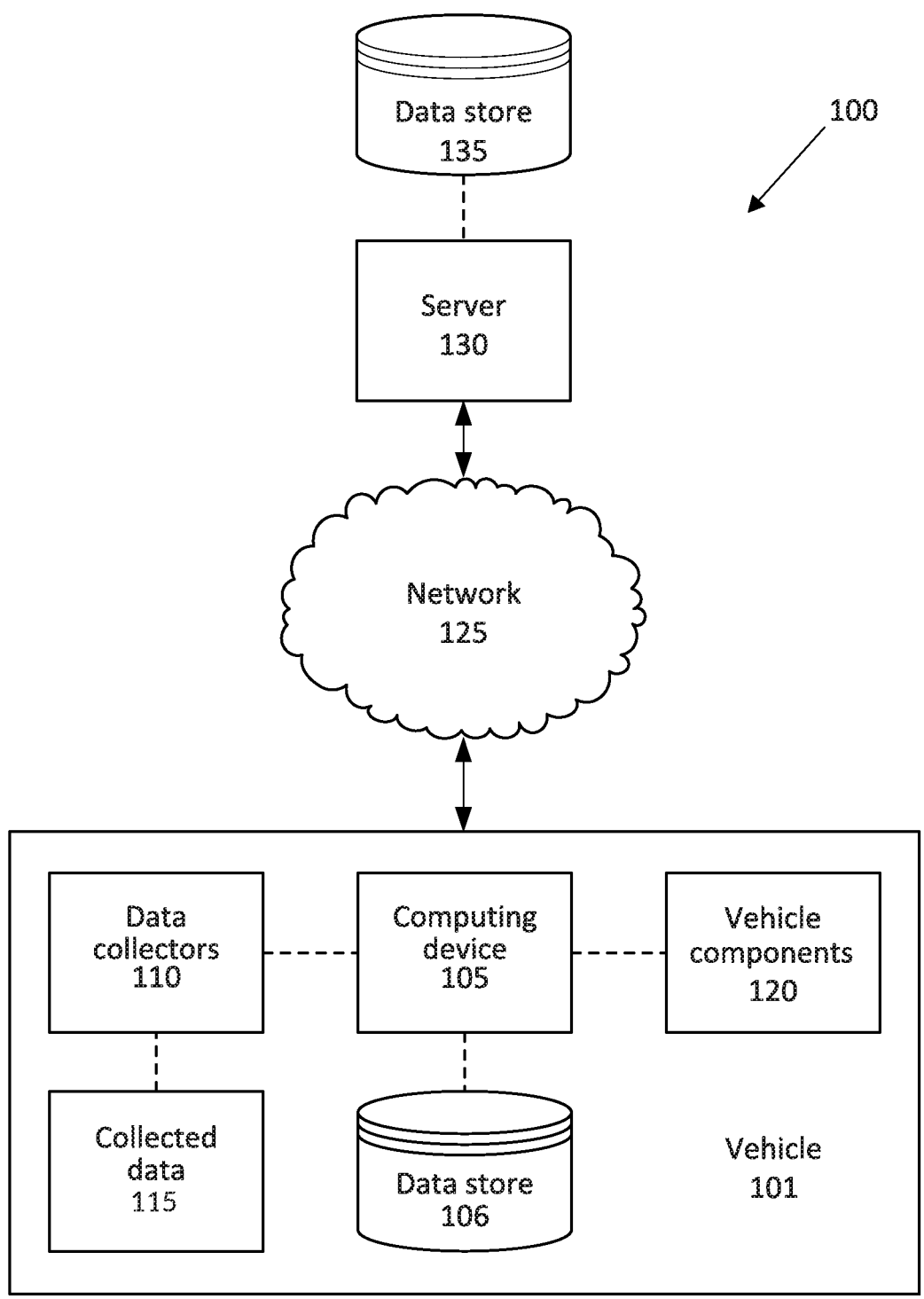
FIG. 1 is a block diagram of an example system for collision prevention and mitigation.

A system includes a computer programmed to determine respective confidence levels of a potential collision for each of a plurality of targets based on each target's heading angle and distance from a host vehicle. The computer is programmed to determine a threat number for each target when its respective confidence level is above a threshold. The computer is programmed to actuate a vehicle component based on the threat number.

The computer can be programmed to determine whether each of the targets is one of a laterally moving target and a longitudinally oncoming target.

The computer can be programmed to determine whether the target heading angle is within a first heading angle range.

The computer can be programmed to determine, for one of the targets, whether the target heading angle is within a second heading angle range and the target was previously determined to have a confidence level above the threshold.

The computer can be programmed to determine whether the distance is below a distance threshold.

The computer can be programmed to select a predetermined maximum number of targets based on the distance. The computer can be programmed to remove a farthest target from the selected targets upon identifying a closer target. The computer can be programmed to increase a confidence counter for one of the targets when the target was previously one of the selected targets. The computer can be programmed to increase the confidence level for one of the targets based on the confidence counter of the target.

The computer can be programmed to determine the confidence level based on a previously determined confidence level.

A method includes determining a respective confidence level of a potential collision for each of a plurality of targets based on each target's heading angle and distance from a host vehicle. The method includes determining a threat number for each target when its respective confidence level is above a threshold The method includes actuating a vehicle component based on the threat number.

The method can include determining whether each of the targets is one of a laterally moving target and a longitudinally oncoming target.

The method can include determining whether the target heading angle is within a first heading angle range.

The method can include determining, for one of the targets, whether the target heading angle is within a second heading angle range and the target was previously determined to have a confidence level above the threshold.

The method can include determining whether the distance is below a distance threshold.

The method can include selecting a predetermined maximum number of targets based on the distance. The method can include removing a farthest target from the selected targets upon identifying a closer target. The method can include increasing a confidence counter for one of the targets when the target was previously one of the selected targets. The method can include increasing the confidence level for one of the targets based on the confidence counter of the target.

The method can include determining the confidence level based on a previously determined confidence level.

A computing device in a vehicle can be programmed to determine a confidence level of a potential collision, based on a target heading angle and respective distances between a host vehicle and one or more targets. The computing device can be further programmed to determine a threat number for each target when the confidence level is above a threshold. The computing device can actuate a vehicle component based on the threat number.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

By determining the threat number for targets with confidence levels above the threshold, the computing device reduces the total number of targets on which the threat assessment is performed. Thus, the total computations performed by the computing device is reduced, and the computing device can more quickly identify potential collisions.

FIG. 1 illustrates a system 100 for collision prevention and mitigation. Unless indicated otherwise in this disclosure, an "intersection" is defined as a location where two or more vehicles' current or potential future trajectories cross. Thus, an intersection could be at any location on a surface where two or more vehicles could collide, e.g. a road, a driveway, a parking lot, an entrance to a public road, driving paths, etc. Accordingly, an intersection is determined by identifying a location where two or more vehicles may meet, i.e., collide. Such determination uses potential future trajectories of a host vehicle 101 as well as nearby other vehicles and/or other objects.

A computing device 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computing device 105 is generally programmed for communications on a vehicle 101 network, e.g., including a communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including sensors 110. Alternatively or additionally, in cases where the computing device 105 actually comprises multiple devices, the vehicle network may be used for communications between devices represented as the computing device 105 in this disclosure. In addition, the computing device 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computing device 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

The computing device 105 may actuate the components 120 to, e.g., brake and/or slow and/or stop the vehicle 101, to avoid targets, etc. The computing device 105 may be programmed to operate some or all of the components 120 with limited or no input from a human operator, i.e., the computing device 105 may be programmed to operate the components 120. When the computing device 105 operates the components 120, the computing device 105 can ignore input from the human operator with respect to components 120 selected for control by the computing device 105, which provides instructions, e.g., via a vehicle 101 communications bus and/or to electronic control units (ECUs) as are known, to actuate vehicle 101 components, e.g., to apply brakes, change a steering wheel angle, etc. For example, if the human operator attempts to turn a steering wheel during steering operation, the computing device 105 may ignore the movement of the steering wheel and steer the vehicle 101 according to its programming.

When the computing device 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computing device 105 and not a human operator. A semi-autonomous mode is one in which at least one of vehicle 101 propulsion (typically via a powertrain including an electric motor and/or internal combustion engine), braking, and steering are controlled at least partly by the computing device 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, BLE, IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
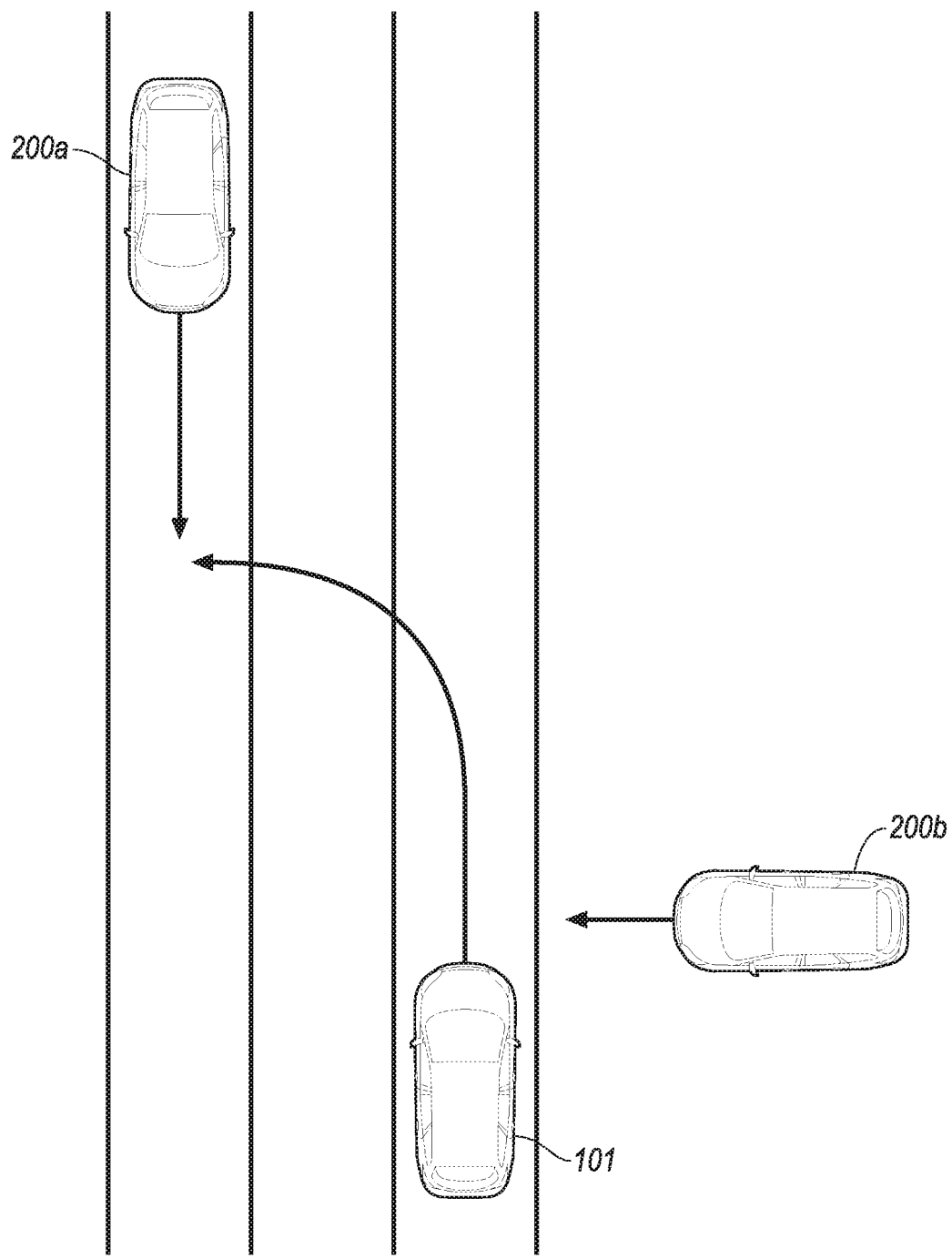
FIG. 2 illustrates an example intersection with a host vehicle and a plurality of targets.

FIG. 2 illustrates an example intersection between a host vehicle 101 and a plurality of targets 200. The example of FIG. 2 includes two targets 200a, 200b. The host vehicle 101 is moving in a roadway lane and is about to turn across adjacent roadway lanes. The computing device 105 can use data 115 from the sensors 110 to identify the targets 200a, 200b as potentially colliding with the host vehicle 101.

The target 200a is moving longitudinally toward the host vehicle 101, i.e., the target 200a is a "longitudinally oncoming" or "oncoming" target 200. Thus, the host vehicle 101 may collide with the target 200a when the host vehicle 101 moves in a turn across the roadway lane of the target 200a. That is, the host vehicle 101 crosses a path of the target 200a. This scenario when the host vehicle 101 is crossing the path of the oncoming target 200a is an "OnComing Turn Across Path" (OCTAP) scenario. The computing device 105 can identify targets 200 such as the target 200a as OCTAP targets 200, as described below.

The target 200b is moving laterally toward the host vehicle 101, i.e., the target 200b is a "laterally moving" target 200. Thus, the host vehicle 101 may collide with the target 200b when the host vehicle 101 moves straight in the current roadway lane and a path of the target 200b crosses the path of the host vehicle 101. This scenario is a "Straight Crossing Path" (SCP) scenario. The computing device 105 can identify targets 200 such as the target 200b as SCP targets, as described below.

Figure 3:
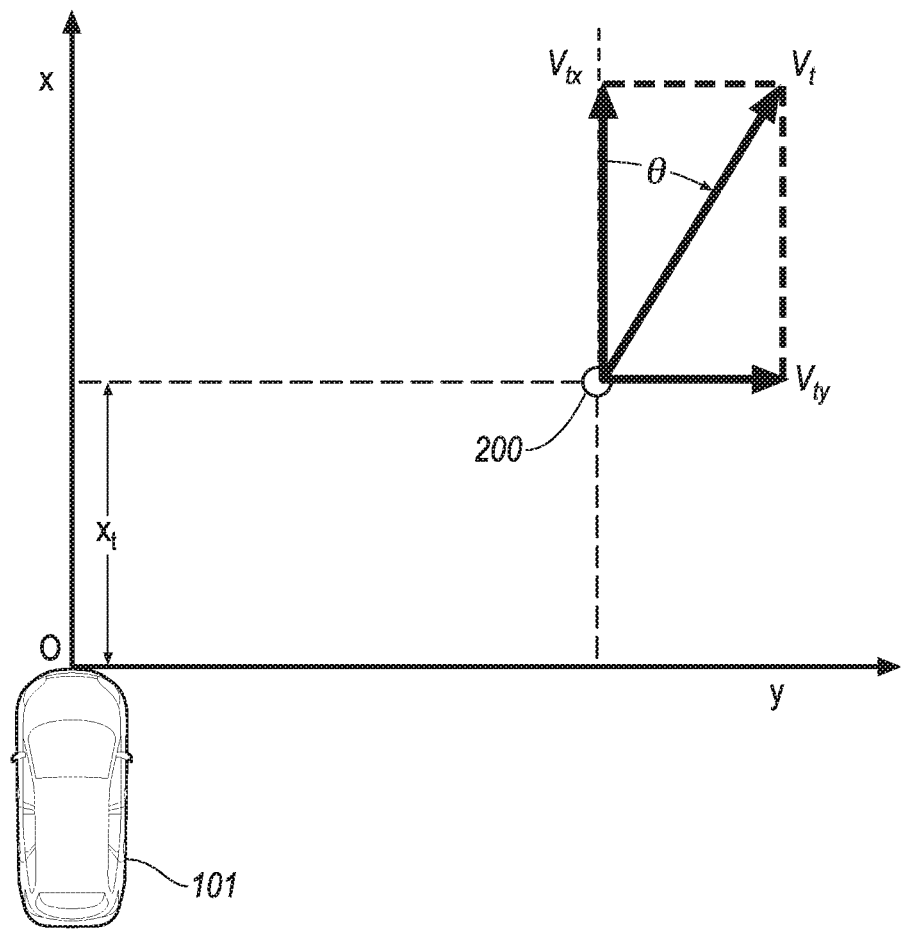
FIG. 3 illustrates example measurements taken by the host vehicle of the target.

FIG. 3 illustrates example measurements of the target 200 measured by the host vehicle 101. The computing device 105 can define a vehicle coordinate system (VCS) with an origin O at a center of a front end of the host vehicle 101. The VCS defines rectangular coordinates that are specified according to orthogonal directions: a lateral direction designated with the variable y, and a longitudinal direction, designated with the variable x. The computing device 105 can predict the position, speed, and acceleration of the host vehicle 101 and the target 200 in both the lateral and longitudinal directions. The computing device 105 can determine the position, speed, and acceleration relative to the ground, defined as "Over-The-Ground" (OTG) values.

The OTG heading angle $\theta$ is the direction of travel of the target 200 relative to the longitudinal axis. The heading angle $\theta$ can be defined in terms of the target 200 lateral velocity $V_{ty}$ and the target 200 longitudinal velocity $V_{tx}$:

$$\theta = \operatorname{atan}\left(\frac{V_{ty}}{V_{tx}}\right) \quad (1)$$

The computing device 105 can actuate the sensors 110 to collect data 115 to determine a longitudinal distance $x_t$ between the host vehicle 101 and the target 200. The computing device 105 can use the distance $x_t$ to determine a likelihood of the target 200 colliding with the host vehicle 101.

Figure 4:
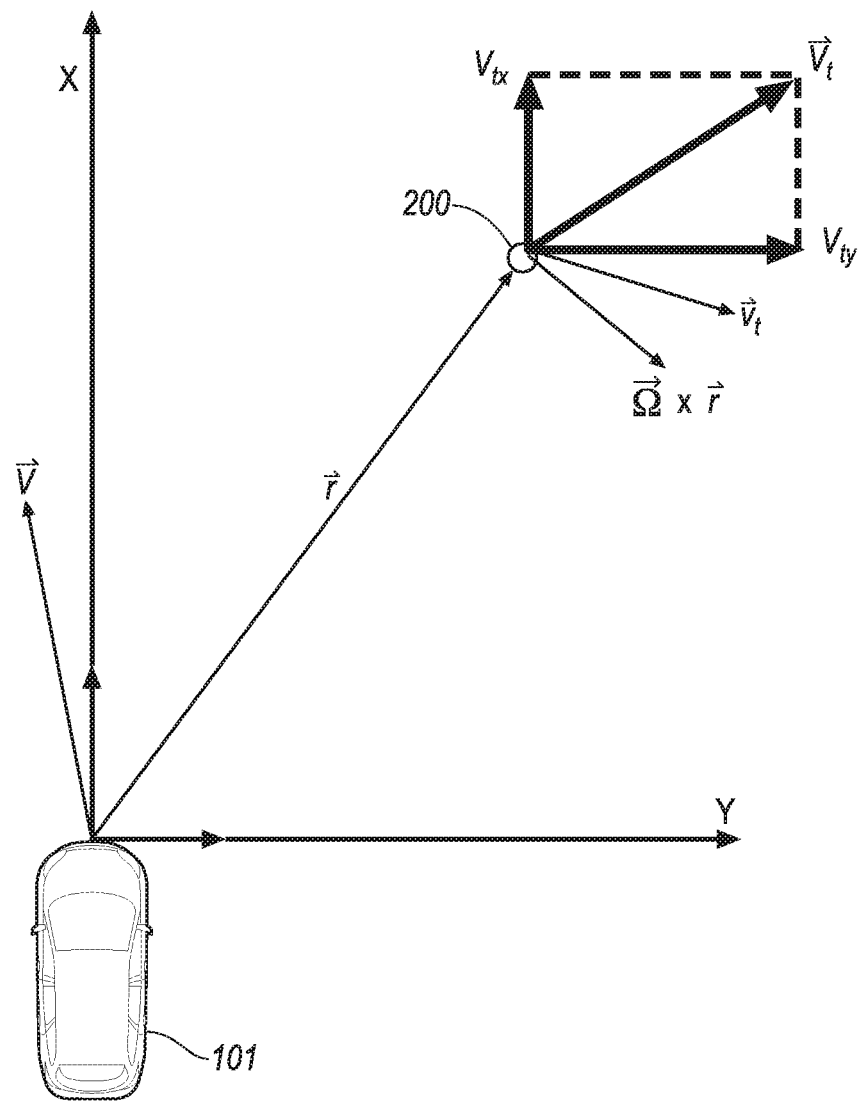
FIG. 4 illustrates other example measurements taken by the host vehicle of the target.

FIG. 4 illustrates other measurements that the computing device 105 can take of the target 200. The computing device 105 can determine the OTG target 200 velocity $\vec{V}_t$:

$$\vec{V}_t = \vec{v}_t + \vec{V} + \vec{\Omega} \times \vec{r} \quad (2)$$

$$\vec{V} = V_x \hat{i} + V_y \hat{j} \quad (3)$$

$$\vec{v}_t = v_{tx} \hat{i} + v_{ty} \hat{j} \quad (4)$$

where $\vec{v}_t$ is the target 200 velocity relative to the host vehicle 101, $\vec{V}$ is the OTG host vehicle 101 velocity vector, $\vec{\Omega}$ is a host vehicle 101 turn rate vector (i.e., a yaw rate vector), $\vec{r}$ is a target 200 position vector relative to the host vehicle 101, $v_{tx}$, $v_{ty}$ are the components of the relative target 200 velocity in the longitudinal and the lateral directions, $V_x$, $V_y$ are the components of the OTG host vehicle 101 velocity vector, and $\hat{i}$, $\hat{j}$ are unit vectors in the longitudinal and lateral directions, respectively.

Figure 5:
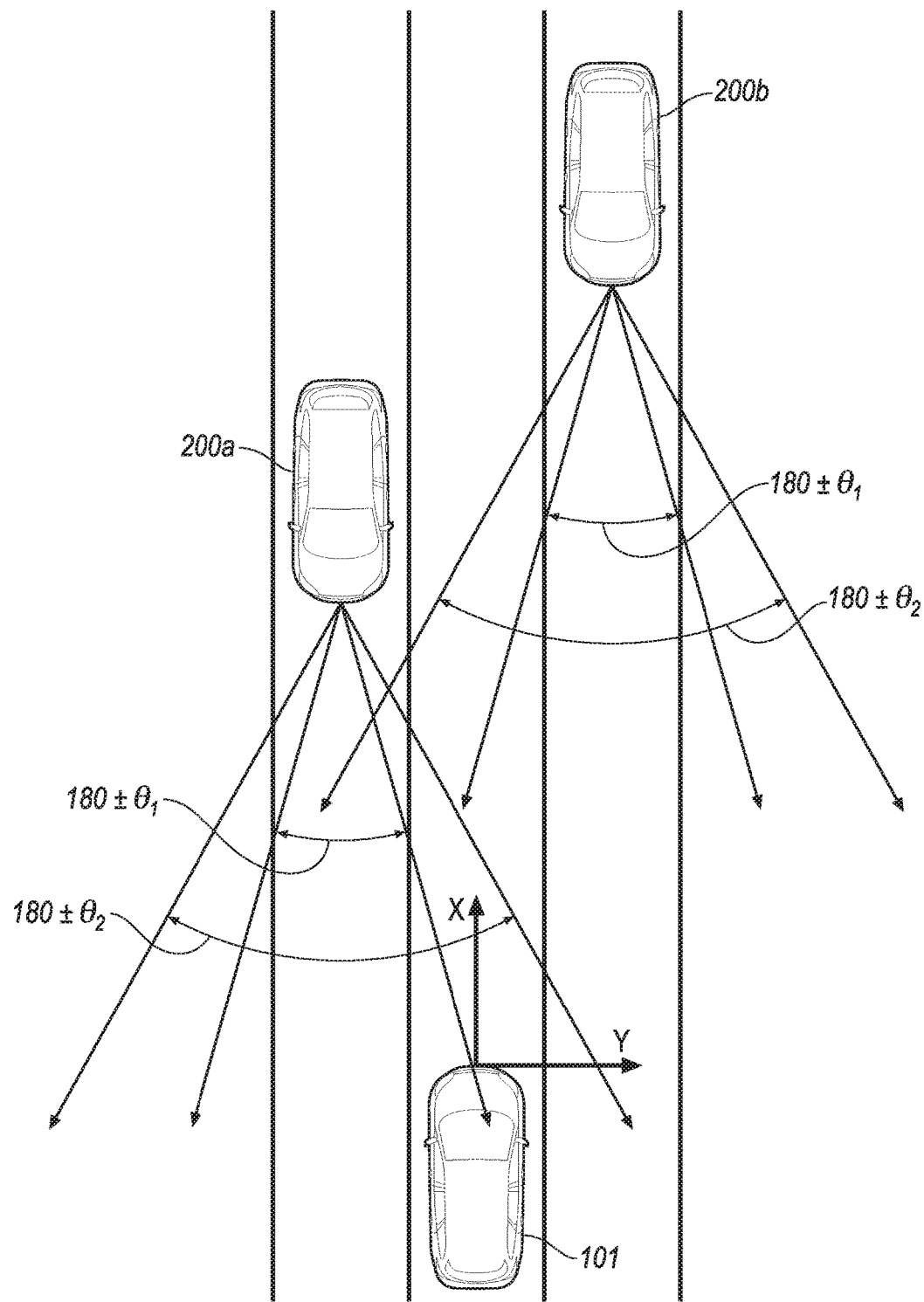
FIG. 5 illustrates another example intersection with a plurality of longitudinally oncoming targets.

FIG. 5 illustrates an example OCTAP scenario. The example of FIG. 5 includes the host vehicle 101 and two oncoming targets 200a, 200b. The computing device 105 can determine whether one or both of the targets 200a, 200b should be selected as OCTAP targets 200. The computing device 105 can use predetermined heading angle thresholds $\theta_1$, $\theta_2$ to determine a first angle range $180 \pm \theta_1$ and a second angle range ($[180+\theta_1, 180+\theta_2]$, $[180-\theta_1, 180-\theta_2]$). The first and second angle ranges can be used to determine whether the targets 200a, 200b could potentially collide with the host vehicle 101. The computing device 105 can also determine a longitudinal distance $x_t$ for each of the targets 200a, 200b and compare the longitudinal distance $x_t$ to a first distance threshold $x_1$. Example values include $\theta_1 = 30°$, $\theta_2 = 60°$, $x_1 = 15$ meters.

The computing device 105 can define three types of OCTAP targets 200. A type I OCTAP target 200 is a target 200 with a heading angle $\theta$ in the first angle range and the longitudinal distance $x_t$ greater than the first distance threshold $x_1$. A type II OCTAP target 200 is a target 200 with a heading angle $\theta$ within the second angle range, the longitudinal distance $x_t$ is greater than the first distance threshold $x_1$, and the target 200 was previously determined to have a confidence level of 3 or more, as described below. A type III OCTAP target 200 is a target 200 having a previously determined confidence level of 3 and a longitudinal distance $x_t$ less than the first distance threshold $x_1$.

Figure 6:
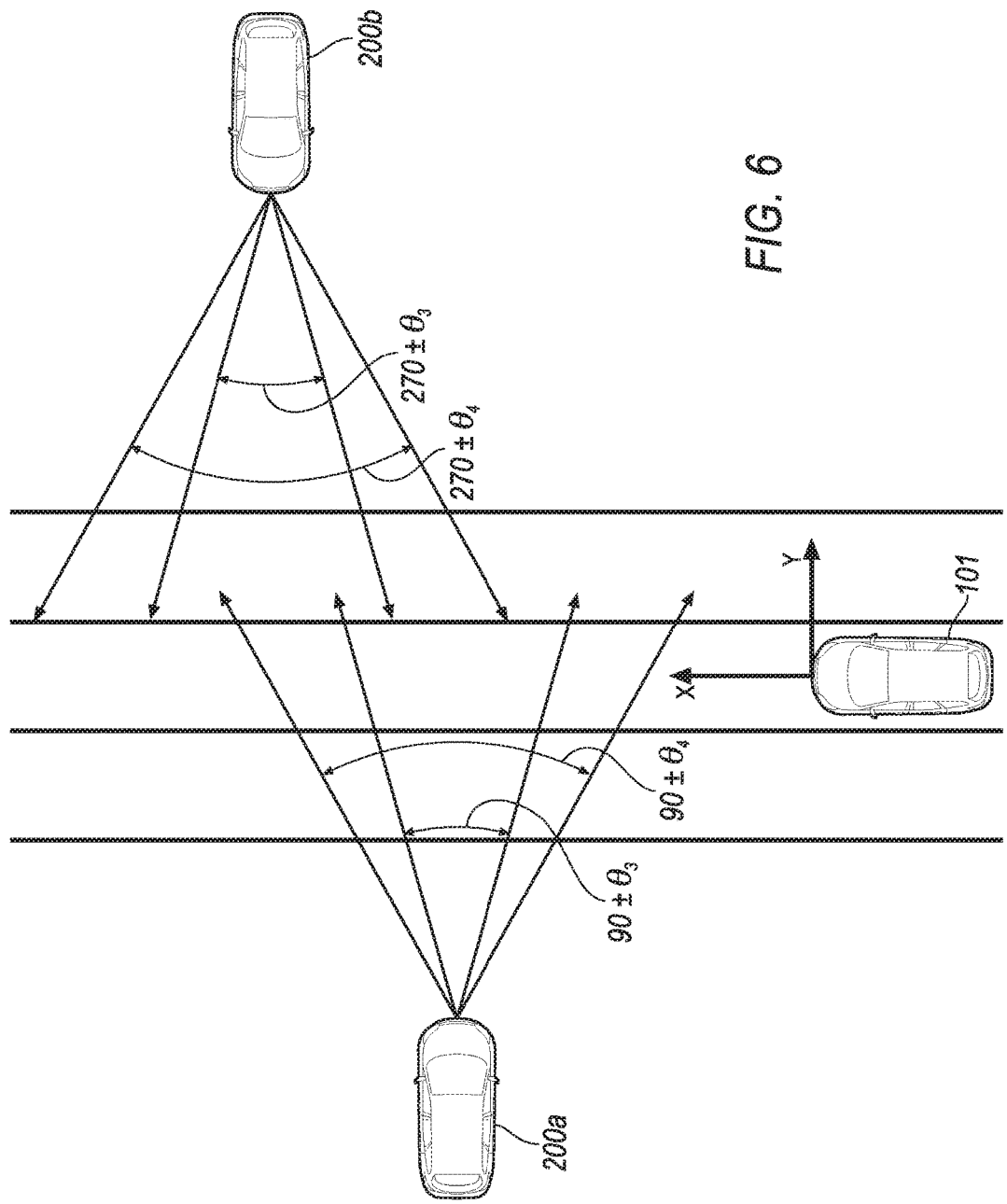
FIG. 6 illustrates another example intersection with a plurality of laterally moving targets.

FIG. 6 illustrates an example SCP scenario. The example of FIG. 6 includes the host vehicle 101 and two laterally moving targets 200a, 200b. The computing device 105 can determine whether one or both of the targets 200a, 200b should be selected as SCP targets 200. The computing device 105 can use predetermined heading angle thresholds $\theta_3$, $\theta_4$ to determine a third angle range $[90 \pm \theta_3, 270 \pm \theta_3]$ and a fourth angle range ($[90+\theta_3, 90+\theta_4]$, $[90-\theta_3, 90-\theta_4]$, $[270+\theta_3, 270+\theta_4]$, $[270-\theta_3, 270-\theta_4]$). Because the laterally moving targets 200a, 200b can be moving in opposite directions in the lateral direction, the third and fourth angle ranges include offsets of both 90 and 270 degrees. The third and fourth angle ranges can be used to determine whether the targets 200a, 200b could potentially collide with the host vehicle 101. The computing device 105 can also determine a longitudinal distance $x_t$ for each of the targets 200a, 200b and compare the longitudinal distance $x_t$ to a second distance threshold $x_2$. Example values include $\theta_3 = 30°$, $\theta_4 = 60°$, $x_2 = 15$ meters.

The computing device 105 can define three types of SCP targets 200. A type I SCP target 200 is a target 200 with a heading angle $\theta$ in the third angle range and the longitudinal distance $x_t$ greater than the second distance threshold $x_2$. A type II SCP target 200 is a target 200 with a heading angle $\theta$ within the fourth angle range, the longitudinal distance $x_t$ is greater than the first distance threshold $x_2$, and the target 200 was previously determined to have a confidence level of 3 or more, as described below. A type III SCP target 200 is a target 200 having a previously determined confidence level of 3 and a longitudinal distance $x_t$ less than the second distance threshold $x_2$.

The computing device 105 can determine that the target 200 is no longer an SCP target 200 based on the heading angle $\theta$. When the target 200 is approaching the host vehicle 101, the heading angle $\theta$ is typically either about 90° or 270° depending on whether the target 200 is moving to the left or to the right in the longitudinal direction. When the target 200 crosses the path of the host vehicle 101, the heading angle θ shifts by 180 degrees, such that a target 200 that had a heading angle θ of 90 degrees prior to crossing the path of the host vehicle 101 will have a heading angle θ of 270 degrees after crossing the path of the host vehicle 101. Similarly, if the target 200 has a heading angle θ of 270 prior to crossing the path of the host vehicle 101, the target 200 will have a heading angle θ of 450 degrees, which is equivalent to a heading angle of 90 degrees. Thus, when the host vehicle 101 determines that the heading angle θ of the target 200 has shifted by 180 degrees, i.e., the target 200 has crossed the path of the host vehicle 101, the target 200 has a much lower probability of colliding with the host vehicle 101 and the target 200 can be identified as not being an SCP target 200 and/or not requiring a threat assessment.

The computing device 105 can select OCTAP and SCP targets 200 up to a maximum number N. By filtering the selection of targets 200 to the maximum number N, the computing device 105 can reduce the total number of threat assessments calculated. The targets 200 selected are the OCTAP and SCP targets 200 that are closest to the host vehicle 101, i.e., the targets 200 with a longitudinal distance $x_t$ smaller than other targets 200.

The computing device 105 can determine a confidence level for each of the targets 200. The confidence level is based on the heading angle θ of the target 200 and the distance $x_t$ of the target 200 from the host vehicle 101. The computing device 105 can use the confidence level to determine whether to perform a threat assessment on the target 200. The confidence level may be a value between 0 and 4, where 0 indicates a low likelihood of a collision and 4 indicates a high likelihood of a collision. The computing device 105 can determine the confidence level for the target 200 in succession more than one time, and based on previous determinations of the confidence level, the computing device 105 can change the current confidence level from a previously determined confidence level. That is, the computing device 105 can repeat the process (such as the process 1100 described below) to determine the confidence level to produce another value for the confidence level for the target 200. Each repeat of the process is one "time" repeating the process and the computing device 105 determines another value of the confidence level each "time" the process repeats. For example, the computing device 105 can determine the confidence level for different numbers of times $n_1$, $n_2$, $n_3$.

The numbers $n_1$, $n_2$, $n_3$ can be predetermined, e.g., by a server 130, and based on a predicted number of times that the computing device 105 can determine the confidence level before reaching the target 200. For example, the number of times can relate to a convergence of a sensing tracking motion prediction algorithm. One of the sensors 110, e.g., a radar, a camera, etc., can directly measure a current position, speed, and acceleration of the target 200. The computing device 105 can then use the motion prediction algorithm to estimate where the target 200 will be the next time the process is performed and the next measurement of the target 200 position, speed, and acceleration. The three numbers $n_1$, $n_2$, $n_3$ can be used by the computing device 105 to determine the confidence level between 0 and 4, as described below. By determining the confidence level a plurality of times, e.g., $n_1$, $n_2$, $n_3$ times, the computing device 105 can more precisely determine the likelihood of a collision between the target 200 and the host vehicle 101. The numbers $n_1$, $n_2 n_3$ can be, e.g., integer values between 3 and 10.

For example, the computing device 105 can assign the confidence level for the target 200 to a value of 0, 1, 2, 3, or 4. A confidence level of 0 can be assigned when the computing device 105 determines that the target 200 is not an OCTAP or SCP target 200 or is a type II OCTAP or SCP target 200 at least $n_3$ consecutive times. A confidence level of 1 can be assigned when the computing device 105 determines that the target 200 is a type I OCTAP or SCP target 200 between 1 and $n_1-1$ consecutive times. A confidence level of 2 can be assigned when the computing device 105 determines that the target 200 is a type I OCTAP or SCP target 200 between $n_1$ and $n_2-1$ consecutive times. A confidence level of 3 can be assigned when the computing device 105 determines that the target 200 is a type I OCTAP or SCP target 200 more than $n_2$ consecutive times or the target 200 is a type III OCTAP or SCP target 200. A confidence level of 4 can be assigned when the computing device 105 determines that the target 200 is a type II OCTAP or SCP target 200 between 1 and $n_3-1$ consecutive times.

The computing device 105 can perform the threat assessment on the selected targets 200 and generate a threat number for each of the targets 200. A threat number is a prediction of whether a specific target 200 will intersect or collide with the host vehicle 101. Specifically, the computing device 105 may determine the acceleration threat number ATN, the brake threat number BTN, and the steering threat number STN for the host vehicle 101 and the target 200, and based on the threat numbers ATN, BTN, STN, which may be combined into a single threat number TN, actuate components 120.

The BTN is a measure of a change in longitudinal acceleration to allow one of the host vehicle 101 to stop or the target 200 to pass the host vehicle 101. The STN is a measure of a change in lateral acceleration to allow one of the host vehicle 101 and the target 200 to clear a crossing zone and/or to steer the host vehicle 101 around a front end or a rear end of the target 200. The ATN is a measure of a specific longitudinal acceleration to allow one of the host vehicle 101 and the target 200 to pass the other of the host vehicle 101 and the target 200. That is, the BTN is a measure of longitudinal acceleration of the host vehicle 101, and may be determined with data 115 from the sensors 110. The STN is a measure of lateral, longitudinal, and/or rotational acceleration of the host vehicle 101. For example, the STN can be based on a steering path curvature, a yaw rate, and/or a steering wheel angle of the host vehicle 101. The ATN is a measure of throttle changes. The computing device 105 may determine the STN, BTN, and/or ATN to for each of the targets 200 to produce the threat number.

The computing device 105 can actuate one or more vehicle components 120 based on the threat number. For example, if the threat number is above 0.7, the computing device 105 can actuate a brake 120 to decelerate the host vehicle 101, e.g., to −6.5 meters per second squared (m/s$^2$). In another example, if the threat number is above 0.4 but less than or equal to 0.7, the computing device 105 can precharge the brake 120 to enable the brake 120 to operate more quickly if the threat number rises above 0.7. For example, if the brake 120 is a hydraulic brake 120, the computing device 105 can increase a hydraulic pressure in the hydraulic brake 120. In another example, if the threat number is greater than 0.2 but less than or equal to 0.4, the computing device 105 can display a visual warning on a vehicle 101 HMI and/or play an audio warning over a speaker.

Figure 7:
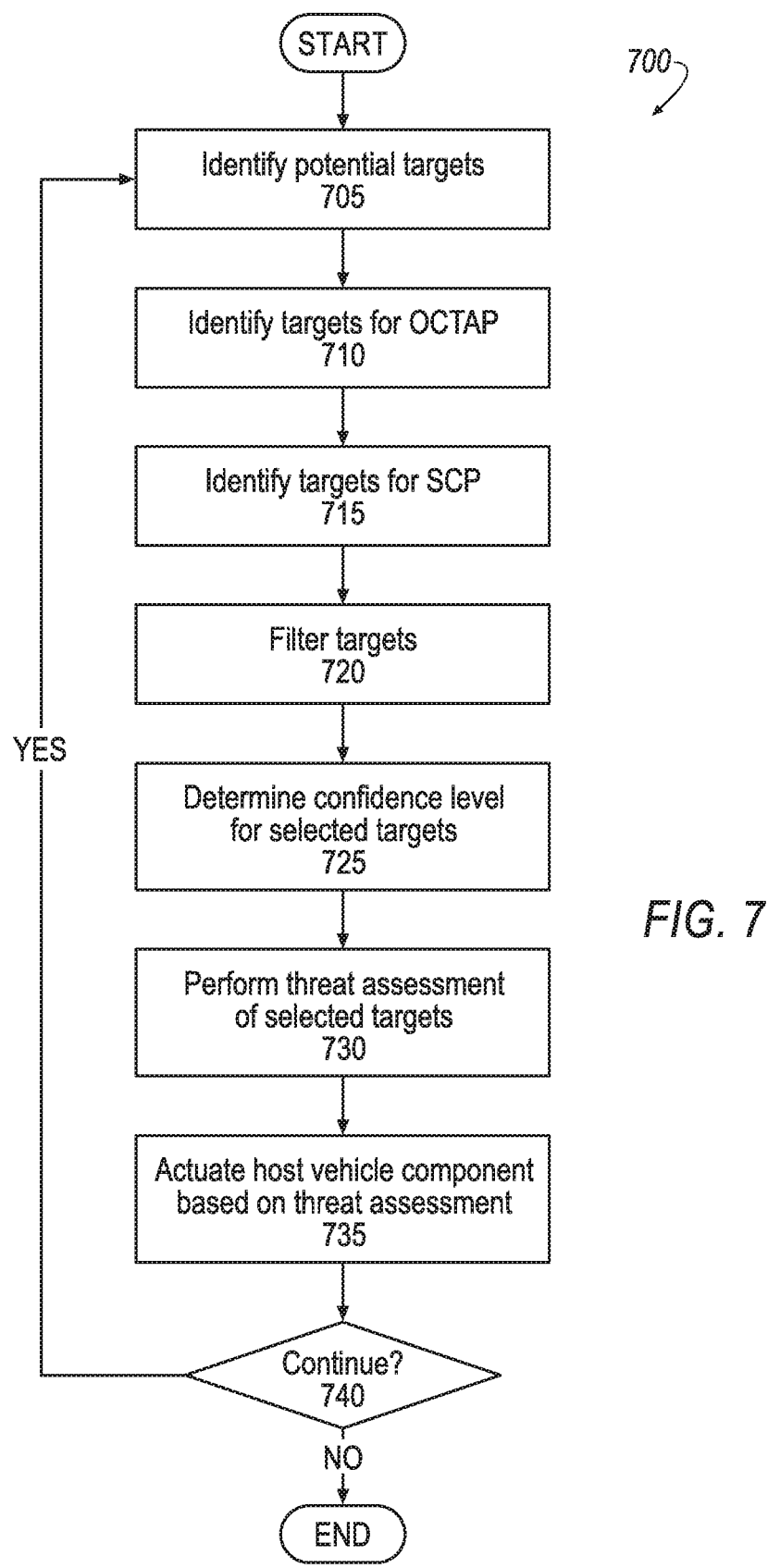
FIG. 7 is a block diagram of an example process for performing a threat assessment on a plurality of targets.

FIG. 7 is a block diagram of an example process 700 for mitigating a collision. The process 700 starts in a block 705, in which the computing device 105 identifies a plurality of potential targets 200. The computing device 105 can actuate sensors 110 to collect data 115 about targets 200 that have a potential to collide with the host vehicle 101.

Next, in a block 710, the computing device 105 identifies the targets 200, if any, that are in an OCTAP scenario. As described above, targets 200 that are moving toward the host vehicle 101 in the longitudinal direction, i.e., oncoming targets 200, can be identified as OCTAP targets 200.

Next, in a block 715, the computing device 105 identifies the targets 200, if any, that are in a SCP scenario. As described above, laterally moving targets 200 can be identified as SCP targets 200.

Next, in a block 720, the computing device 105 filters the targets 200 to the predetermined maximum number N. As described above, performing a threat assessment on each identified target 200 can be computationally costly, so the computing device 105 can select a predetermined maximum number N of targets 200 on which to perform the threat assessment. The computing device 105 filters the total number of target 200 to the maximum number N.

Next, in a block 725, the computing device 105 determines a confidence level for each of the selected targets 200. As described above, the confidence level can be used to determine the likelihood of a collision between the host vehicle 101 and the target 200.

Next, in a block 730, the computing device 105 performs a threat assessment for each of the selected targets 200. As described above, the threat assessment can result in a threat number indicating a likelihood of a collision.

Next, in a block 735, the computing device 105 actuates a host vehicle component 120 based on the threat assessment. For example, if the threat number is between 0.2 and 1, the computing device 105 can actuate a warning, e.g., an audio alert, a visual alert, a message to a user portable device, etc. If the threat number is between 0.2 and 0.7, the computing device 105 can pre-charge a brake 120, as described above. The computing device 105 can further actuate an Emergency Brake Assist (EBA) that actuates an antilock brake system (ABS) prior to full actuation of the brake 120 by the user. The computing device 105 can further actuate a dynamic brake 120 support, which increases a brake 120 power based on the threat number. Furthermore, if the host vehicle 101 is in an autonomous or semi-autonomous mode, the computing device 105 can actuate the brake 120 without input from the user. Following the block 735, the process 700 ends.

Next, in a block 740, the computing device 105 determines whether to continue the process 700. The computing device 105 can determine to continue the process 700 if the host vehicle 101 is still driving along the roadway. If the computing device 105 determines to continue the process 700, the process 700 returns to the block 705 to identify more targets 200.

Figure 8:
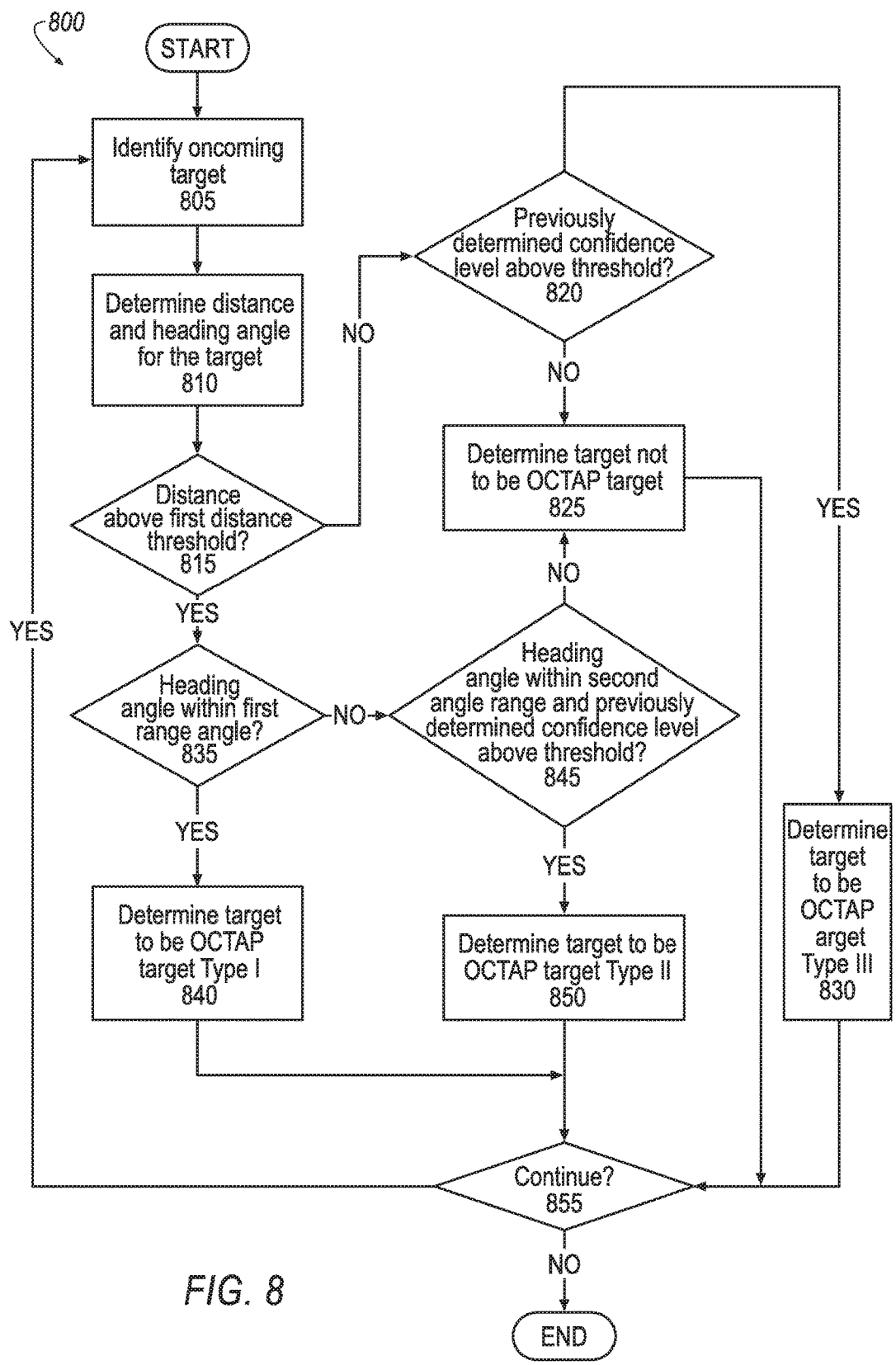
FIG. 8 is a block diagram of an example process for identifying longitudinally oncoming targets.

FIG. 8 illustrates an example process 800 for classifying a target 200 in an OCTAP scenario. The process 800 begins in a block 805, in which the computing device 105 identifies an oncoming target 200. As described above, an oncoming target 200 is a target 200 moving toward the host vehicle 101 in the longitudinal direction.

Next, in a block 810, the computing device 105 determines the distance $x_t$ and the heading angle $\theta$ for the target 200. The computing device 105 can use data 115 from the sensors 110 to determine the distance $x_t$ and the heading angle $\theta$, as described above.

Next, in a block 815, the computing device 105 determines whether the distance $x_t$ is above a first threshold $x_1$. If the distance $x_t$ is above the first threshold, the process 800 continues in a block 835. Otherwise, the process 800 proceeds to the block 820.

In the block 820, the computing device 105 determines whether the target 200 was previously determined to have a confidence level above a threshold. For example, the threshold can be 3. As described above, the computing device 105 can determine the confidence level for the target 200 a plurality of times, and the computing device 105 examines whether the most recent determination of the confidence level is above the threshold. If the most recent determination of the confidence level for the target 200 was above the threshold, the process 800 continues in a block 830. Otherwise, the process 800 continues in a block 825.

In the block 825, the computing device 105 determines that the target 200 is not an OCTAP target 200. The process 800 then continues in a block 855.

In the block 830, the computing device 105 determines that the target 200 is an OCTAP Type III target 200. The process 800 then continues in the block 855.

In the block 835, the computing device 105 determines whether the heading angle $\theta$ is within a first angle range. The first angle range, as described above, can be used to determine the type of OCTAP target 200. If the heading angle $\theta$ is within the first angle range, the process 800 continues in a block 840. Otherwise, the process 800 continues in a block 845.

In the block 840, the computing device 105 determines that the target 200 is an OCTAP Type I target 200. The process 800 continues in the block 855.

In the block 845, the computing device 105 determines whether the heading angle $\theta$ is within a second angle range and the most recently determined confidence level for the target 200 is 3 or more. If the heading angle $\theta$ is within the second angle range, the process 800 continues in a block 850. Otherwise, the process 800 continues in the block 825.

In the block 850, the computing device 105 determines that the target 200 is an OCTAP Type II target 200. The process 800 continues in the block 855.

In the block 855, the computing device 105 determines whether to continue the process 800. Based on continued determinations of the confidence level and the distance $x_t$ of the target 200, the type of OCTAP target 200 can change as the host vehicle 101 moves toward the target 200. If the computing device 105 determines to continue, the process 800 returns to the block 805 to identify another oncoming target 200. Otherwise, the process 800 ends.

Figure 9:
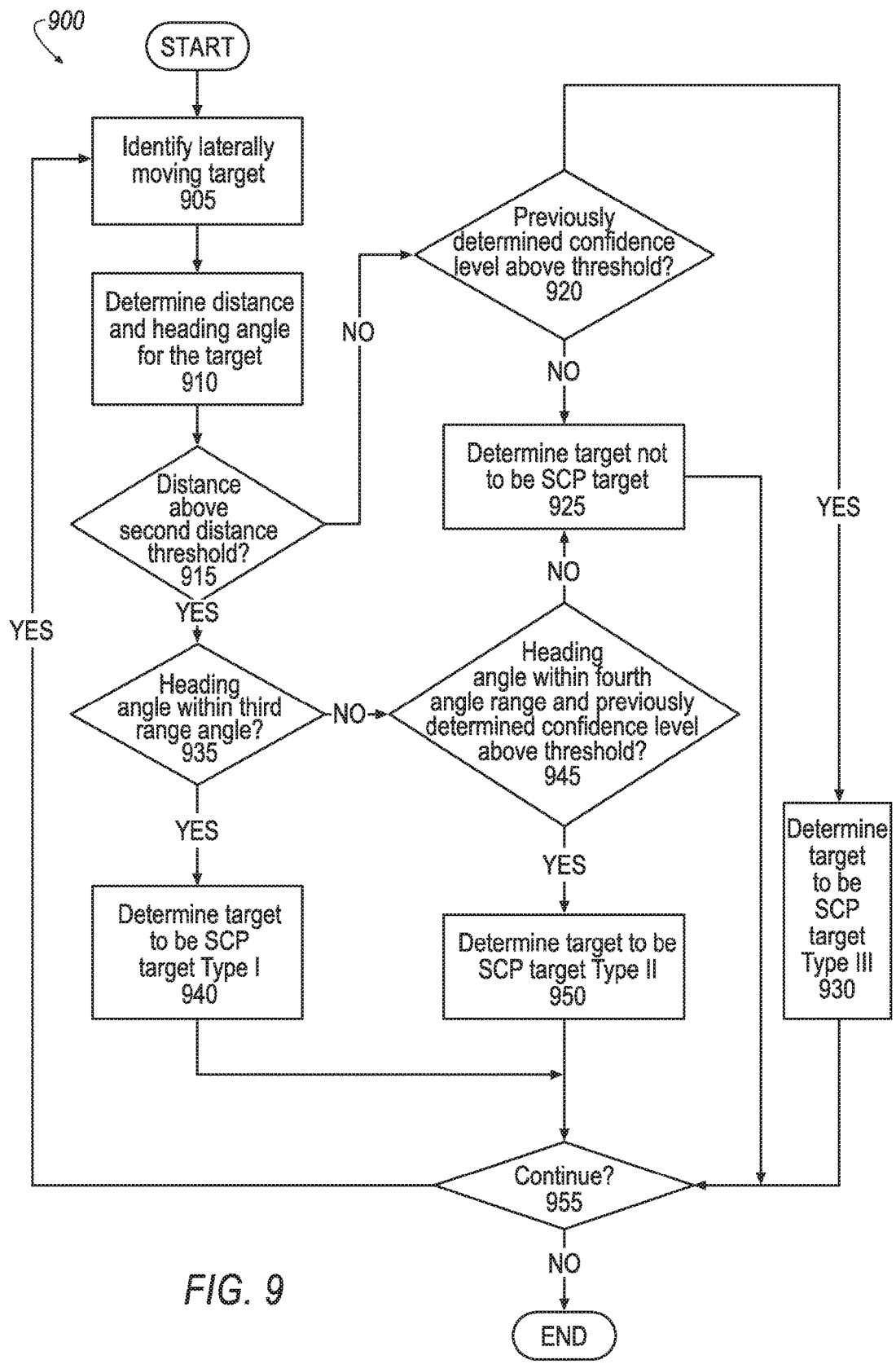
FIG. 9 is a block diagram of an example process for identifying laterally moving targets.

FIG. 9 illustrates an example process 900 for classifying a target 200 in an SCP scenario. The process 900 begins in a block 905, in which the computing device 105 identifies a laterally moving target 200. As described above, a laterally moving target 200 is a target 200 moving toward the host vehicle 101 in the lateral direction.

Next, in a block 910, the computing device 105 determines the distance $x_t$ and the heading angle $\theta$ for the target 200. The computing device 105 can use data 115 from the sensors 110 to determine the distance $x_t$ and the heading angle $\theta$, as described above.

Next, in a block 915, the computing device 105 determines whether the distance is above a second threshold $x_2$. If the distance $x_t$ is above the second threshold, the process 900 continues in a block 935. Otherwise, the process 900 proceeds to the block 920.

In the block 920, the computing device 105 determines whether the target 200 was previously determined to have a confidence level above a threshold. For example, the threshold can be 3. As described above, the computing device 105 can determine the confidence level for the target 200 a plurality of times, and the computing device 105 examines whether the most recent determination of the confidence level is above the threshold. If the most recent determination of the confidence level for the target 200 was above the threshold, the process 900 continues in a block 930. Otherwise, the process 900 continues in a block 925.

In the block 925, the computing device 105 determines that the target 200 is not an SCP target 200. The process 900 then continues in a block 955.

In the block 930, the computing device 105 determines that the target 200 is an SCP Type III target 200. The process 900 then continues in the block 955.

In the block 935, the computing device 105 determines whether the heading angle θ is within a third angle range, as described above. The third angle range, as described above, can be used to determine the type of SCP target 200. If the heading angle θ is within the third angle range, the process 900 continues in a block 940. Otherwise, the process 900 continues in a block 945.

In the block 940, the computing device 105 determines that the target 200 is an SCP Type I target 200. The process 900 continues in the block 955.

In the block 945, the computing device 105 determines whether the heading angle θ is within a fourth angle range, as described above, and the most recently determined confidence level for the target 200 is 3 or more. If the heading angle θ is within the fourth angle range and the most recently determined confidence level for the target 200 is 3 or more, the process 900 continues in a block 950. Otherwise, the process 900 continues in the block 925.

In the block 950, the computing device 105 determines that the target 200 is an SCP Type II target 200. The process 900 continues in the block 955.

In the block 955, the computing device 105 determines whether to continue the process 900. Based on continued determinations of the confidence level and the distance $x_t$ of the target 200, the type of SCP target 200 can change as the host vehicle 101 moves toward the target 200. If the computing device 105 determines to continue, the process 900 returns to the block 905 to identify another laterally moving target 200. Otherwise, the process 900 ends.

Figure 10:
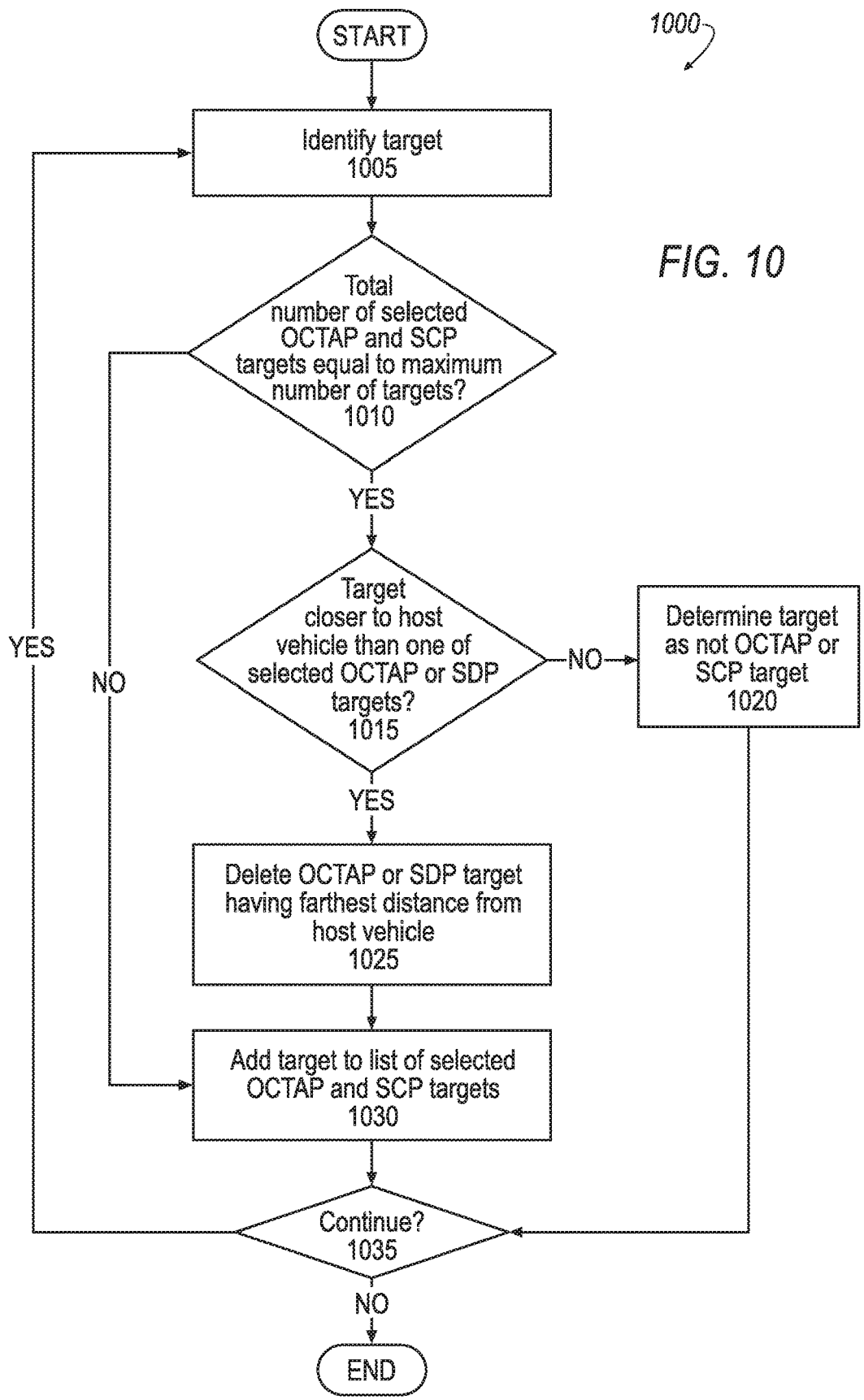
FIG. 10 is a block diagram of an example process for selecting a predetermined number of targets for threat assessment.

FIG. 10 is a block diagram of an example process 1000 for filtering the targets 200. The process 1000 begins in a block 1005, in which the computing device 105 identifies one of the targets 200.

Next, in a block 1010, the computing device 105 determines whether the total number of targets 200 selected exceeds the maximum number N of targets 200. The computing device 105 can perform the threat assessment for a limited number of targets 200, and the computing device 105 may have already selected N targets to perform the threat assessment. If the total number of targets 200 selected exceeds the maximum number N, the process 1000 continues in a block 1015. Otherwise, the process 1000 continues in a block 1030.

In the block 1015, the computing device 105 determines whether the target 200 is closer to the host vehicle 101 than one of the previously selected targets 200. That is, the computing device 105 compares the distance $x_t$ of the current target 200 to the distances $x_t$ for each of the previously selected targets 200, if any. If the distance $x_t$ of the current target 200 is smaller than the distance $x_t$ of one of the other selected targets 200, the current target 200 is closer to the host vehicle 101 than that one selected target 200. If the target 200 is closer to the host vehicle 101 than one of the selected targets 200, the process 1000 continues in a block 1025. Otherwise, the process 1000 continues in a block 1020.

In the block 1020, the computing device 105 determines not to select the target 200. That is, the target 200 is not chosen for selection and future threat assessment. The process 1000 continues in a block 1035.

In the block 1025, the computing device 105 deletes the OCTAP or SCP target 200 that is farthest from the host vehicle 101. The computing device 105 compares the distances $x_t$ for all selected targets 200 and removes the target 200 having the highest distance $x_t$. Thus, the computing device 105 filters from all of the targets 200 to a smaller subset of targets 200.

In the block 1030, the computing device 105 adds the target 200 to the list of selected targets 200. The computing device 105 can use the list to determine which targets 200 to perform the threat assessment.

In the block 1035, the computing device 105 determines whether to continue the process 1000. The computing device 105 can determine to continue the process based on, e.g., detecting more targets 200 that may be added to the list. If the computing device 105 determines to continue, the process 1000 returns to the block 1005 to identify another target 200. Otherwise, the process 1000 ends.

Figure 11:
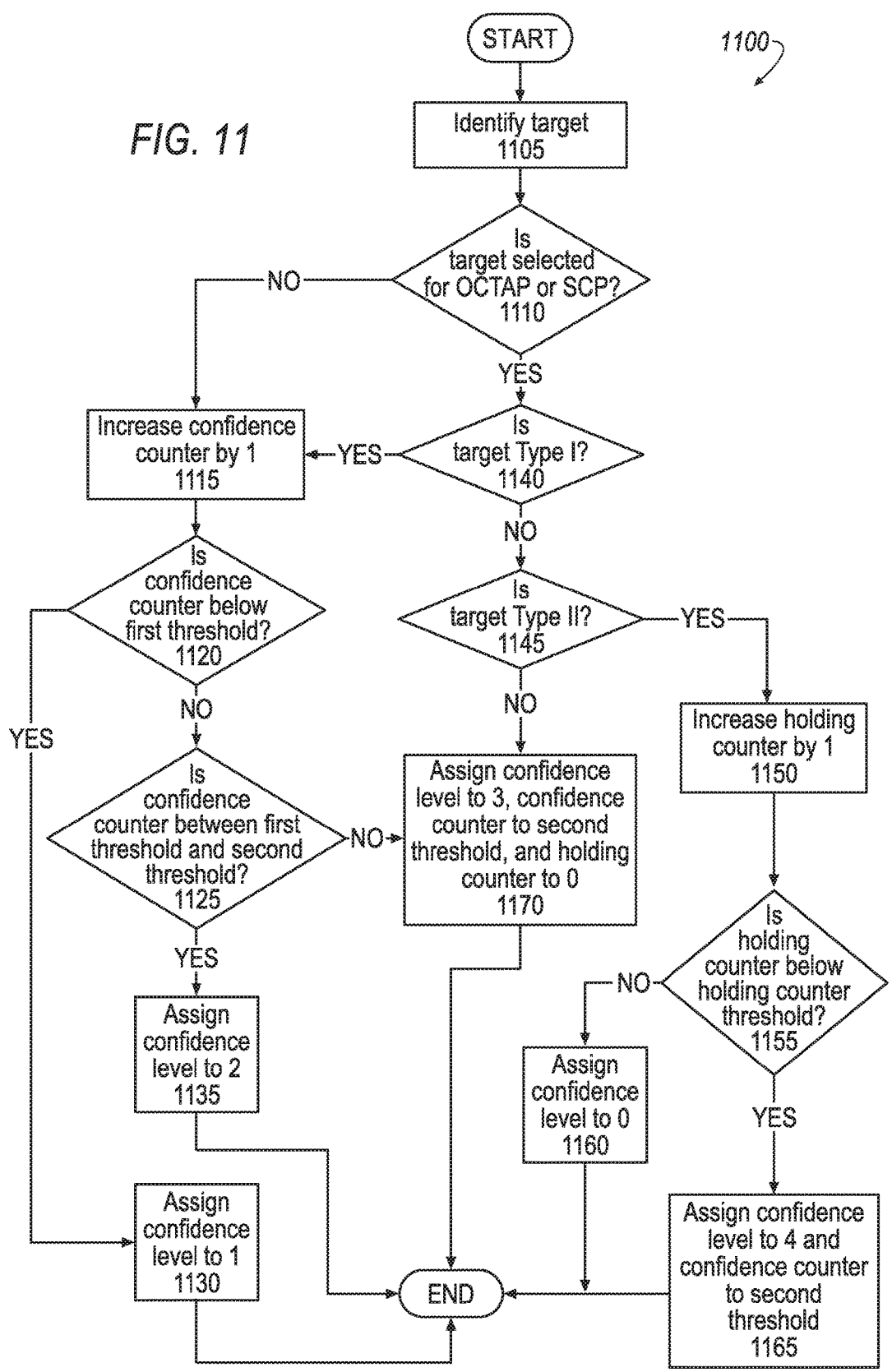
FIG. 11 is a block diagram of an example process for determining a confidence level for each target.

FIG. 11 is a block diagram of an example process 1100 for determining the confidence level for a target 200. The process 1100 begins in a block 1105, in which the computing device 105 identifies the target 200.

Next, in a block 1110, the computing device 105 determines whether the target 200 is one of an OCTAP target 200 or a SCP target 200. The computing device 105 can determine whether the target 200, based on the processes such as the example processes 800 and 900 above, is selected as an OCTAP target 200 or a SCP target 200. If the target 200 is an OCTAP target 200 or a SCP target 200, the process 1100 continues in a block 1140. Otherwise, the process 1100 continues in a block 1115.

In the block 1115, the computing device 105 increases a confidence counter value by 1. The confidence counter value can be used to determine the confidence level of the target 200.

Next, in a block 1120, the computing device 105 determines whether the confidence counter value is below a first threshold. The confidence counter is a measure of a number of times that the computing device 105 has determined a confidence threshold for the target 200. The first threshold can be a predetermined number, such as $n_1$ described above. If the confidence counter value is below the first threshold, the process 1100 continues in a block 1130. Otherwise, the process 1100 continues in a block 1125.

In the block 1125, the computing device 105 determines whether the confidence counter value is between the first threshold, e.g., $n_1$, and a second threshold. The second threshold can be a predetermined number, such as $n_2$ described above. If the confidence counter value is between the first threshold and the second threshold, the process 1100 continues in a block 1135. Otherwise, the process 1100 continues in a block 1170.

In the block 1130, the computing device 105 assigns the target 200 with a confidence level of 1, and the process 1100 ends.

In the block 1135, the computing device 105 assigns the target 200 with a confidence level of 2, and the process 1100 ends.

In the block 1140, the computing device 105 determines whether the target 200 is one of a Type I OCTAP target 200 and a Type I SCP target 200. If the target 200 is a Type I OCTAP target 200 or a Type I SCP target 200, the process 1100 continues in the block 1115. Otherwise, the process 1100 continues in a block 1145.

In the block 1145, the computing device 105 determines whether the target 200 is one of a Type II OCTAP target 200 and a Type II SCP target 200. If the target 200 is a Type II OCTAP target 200 or a Type II SCP target 200, the process 1100 continues in a block 1150. Otherwise, the process 1100 continues in the block 1170.

In the block 1150, the computing device 105 increases a holding counter value by 1. The holding counter is a measure of the number of times that the computing device 105 has determined the confidence value for the target 200, and can be used to determine the confidence level of the target 200.

Next, in a block 1155, the computing device 105 determines whether the holding counter value is below a holding counter value threshold. The holding counter value threshold can be a predetermined number, such as $n_3$ as described above. If the holding counter value is below the holding counter value threshold, the process 1100 continues in a block 1165. Otherwise, the process 1100 continues in a block 1160.

In the block 1160, the computing device 105 assigns the target 200 with a confidence level of 0, and the process 1100 ends.

In the block 1165, the computing device 105 assigns the target 200 with a confidence level of 4 and resets the confidence counter value to the second level $n_2$. Following the process 1170, the process 1100 ends.

In the block 1170, the computing device 105 assigns the target 200 with a confidence value of 3, resets the confidence counter value to the second level $n_2$, and resets the holding counter value to 0. Following the block 1170, the process 1100 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 700, one or more of the steps could be omitted, or the steps could be executed in a different order than shown in FIG. 7. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   classify each of a plurality of targets according to a type of each target, the type indicating an angle range of a target's heading angle and a distance from the host vehicle;
   determine confidence levels of respective likelihoods of potential collisions for each of a plurality of targets based on each target's type and a number of times the type of the target was previously classified;
   determine an overall threat number based on at least one of a braking, steering, and acceleration threat number, for each target when its respective confidence level is above a threshold; and
   actuate a vehicle component based on the overall threat number.

2. The system of claim 1, wherein the instructions further include instructions to classify each of the targets as one of a laterally moving target and a longitudinally oncoming target.

3. The system of claim 1, wherein the instructions further include instructions to determine whether the target heading angle is within a first heading angle range.

4. The system of claim 1, wherein the instructions further include instructions to determine, for one of the targets, whether the target heading angle is within a second heading angle range and the target was previously determined to have a confidence level above the threshold.

5. The system of claim 1, wherein the instructions further include instructions to determine whether the distance is below a distance threshold.

6. The system of claim 1, wherein the instructions further include instructions to select a predetermined maximum number of targets based on the distance when the plurality of targets exceeds the predetermined maximum number of targets.

7. The system of claim 6, wherein the instructions further include instructions to remove a farthest target from the selected targets upon identifying a closer target.

8. The system of claim 6, wherein the instructions further include instructions to increase a confidence counter for one of the targets when the target was previously one of the selected targets.

9. The system of claim 8, wherein the instructions further include instructions to increase the confidence level for one of the targets based on the confidence counter of the target.

10. The system of claim 1, wherein the instructions further include instructions to determine the confidence level based on a previously determined confidence level.

11. A method, comprising:
classifying each of a plurality of targets according to a type of each target, the type indicating an angle range of a target's heading angle and a distance from the host vehicle;
determining confidence levels of respective likelihoods of potential collisions for each of a plurality of targets based on each target's type and a number of times the type of the target was previously classified;
determining an overall threat number based on at least one of a braking, steering, and acceleration threat number, for each target when its respective confidence level is above a threshold; and
actuating a vehicle component based on the overall threat number.

12. The method of claim 11, further comprising classifying each of the targets as one of a laterally moving target and a longitudinally oncoming target.

13. The method of claim 11, further comprising determining whether the target heading angle is within a first heading angle range.

14. The method of claim 11, further comprising determining, for one of the targets, whether the target heading angle is within a second heading angle range and the target was previously determined to have a confidence level above the threshold.

15. The method of claim 11, further comprising determining whether the distance is below a distance threshold.

16. The method of claim 11, further comprising selecting a predetermined maximum number of targets based on the distance when the plurality of targets exceeds the predetermined maximum number of targets.

17. The method of claim 16, further comprising removing a farthest target from the selected targets upon identifying a closer target.

18. The method of claim 16, further comprising increasing a confidence counter for one of the targets when the target was previously one of the selected targets.

19. The method of claim 18, further comprising increasing the confidence level for one of the targets based on the confidence counter of the target.

20. The method of claim 11, further comprising determining the confidence level based on a previously determined confidence level.

\* \* \* \* \*